(12) United States Patent
Kobayashi

(10) Patent No.: US 7,589,785 B2
(45) Date of Patent: Sep. 15, 2009

(54) FLASH UNIT, CAMERA DEVICE, AND MOBILE TERMINAL

(75) Inventor: Hirotaka Kobayashi, Kitami (JP)

(73) Assignee: Kyocera Corporation, Fushimi-ku, Kyoto-shi, Kyoto (JP)

( * ) Notice: Subject to any disclaimer, the term of this patent is extended or adjusted under 35 U.S.C. 154(b) by 753 days.

(21) Appl. No.: 10/796,734

(22) Filed: Mar. 8, 2004

(65) Prior Publication Data
US 2005/0162543 A1   Jul. 28, 2005

(30) Foreign Application Priority Data
Mar. 10, 2003   (JP)   ............... 2003-063594

(51) Int. Cl.
*H04N 5/222*   (2006.01)

(52) U.S. Cl. .................. 348/371; 348/372; 396/155

(58) Field of Classification Search .......... 348/371, 348/370, 372, 222.1; 362/3, 16; 396/155, 396/157, 164, 182, 205; 455/556.1, 567
See application file for complete search history.

(56) References Cited

U.S. PATENT DOCUMENTS

| | | | | |
|---|---|---|---|---|
| 6,011,929 | A * | 1/2000 | Fuke et al. | 396/175 |
| 6,448,550 | B1 * | 9/2002 | Nishimura | 250/226 |
| 6,823,198 | B2 * | 11/2004 | Kobayashi | 455/556.1 |
| 6,850,375 | B2 | 2/2005 | Tenmyo | |
| 7,136,672 | B2 * | 11/2006 | Kitano et al. | 455/556.1 |
| 2002/0089601 | A1 * | 7/2002 | Fumio et al. | 348/373 |

FOREIGN PATENT DOCUMENTS

| | | |
|---|---|---|
| CN | 1086475 C | 6/2002 |
| CN | 1385751 A | 12/2002 |
| JP | 4-34423 | 2/1992 |
| JP | H7-209714 | 11/1995 |
| JP | 11133490 A * | 5/1999 |
| JP | 2003-043557 | 2/2003 |
| JP | 2003-101836 | 4/2003 |
| JP | 2003-338857 | 11/2003 |

OTHER PUBLICATIONS

Japanese Office Action dated Sep. 4, 2007 with English translation.
Chinese Office Action dated May 11, 2007 with English translation.
Japanese Office Action dated Apr. 15, 2008 with English translation.

* cited by examiner

*Primary Examiner*—Sinh Tran
*Assistant Examiner*—Yogesh K Aggarwal
(74) *Attorney, Agent, or Firm*—Schulte Roth & Zabel LLP; John C. Garces

(57) ABSTRACT

A flash unit having a light emitting element, and a light condensing plate. The light condensing plate is provided with a surface on which a dimmed light-dispersing print is disposed near the light emitting element for equalizing intensity of the light emitted from the light emitting element. The other side of the light condensing plate contains a convexo-concave surface for condensing the light emitted from the light emitting element. The present invention provides a flash unit, a camera device, and a mobile terminal having a small dimension so as to provide a flash unit having an increased flash light.

13 Claims, 6 Drawing Sheets

Prior Art

US 7,589,785 B2

FLASH UNIT, CAMERA DEVICE, AND MOBILE TERMINAL

CROSS-REFERENCE TO RELATED APPLICATIONS

This application claims all rights of priority to Japanese Patent Application No. 2003-063594 filed on Mar. 10, 2003, (pending).

BACKGROUND OF THE INVENTION

The present invention relates to a flash unit which is used for a camera device, or a mobile terminal.

Conventionally, as shown in FIGS. 8A and 8B, a flash for a camera module comprises a flash tube 24 which serves as a light source, a reflecting mirror 23 is disposed behind the flash tube to forwardly reflect the light emitted from the flash tube, a light condensing plate 22 provided with a convexo-concave wavy surface on the flash tube for condensing the light emitted from the flash tube and the reflecting mirror, and a casing 21 to contain the above elements (see Japanese Unexamined Patent Application, First Publication No. Hei 4-34423, pages 2 to 4, and FIG. 1). Another typical embodiment is shown in FIGS. 9A and 9B. A LED (light emitting diode) 26 which serves as a light source, a base board 27 for mounting an LED thereon, and a plate 28 to which a dense white dispersion print is placed on the surface facing the LED (or a plate which is formed by a lactescent resin member) disposed such that the LED and the base board on which the LED is mounted cannot be viewed from the outside.

However, in the flash for the camera module shown in FIGS. 8A and 8B, there has been a problem that an entire structure of the flash is large or thick because the flash tube 24 itself which is used for the light source is a large member.

In the flash for the camera module which is built in the mobile phone device as shown in FIGS. 9A and 9B, it is possible to use a smaller flash by using the LED 26 for a light source. However, there has been a problem in that it is not possible to have a sufficient amount of flash light. This disadvantage occurs because in order to prevent the flash from being seen, plate 28 is provided and does not allow the LED to provide a sufficient light amount.

SUMMARY OF THE INVENTION

An object of the present invention is to provide a flash unit, a camera device, and a mobile terminal which can provide an increased amount of flash light. Another object of the present invention is to provide a smaller sized flash.

In order to solve the above problems, the flash unit comprises a light emitting element and a light condensing plate. The light condensing plate is provided with a light dispersing surface on the side of the light condensing plate facing the light emitting element to equalize the intensity of the light emitted from the light emitting element. A convexo-concave surface is on other side of the light condensing plate for condensing the light emitted from the light emitting element. Also, it is preferable that the flash unit of the present invention further comprises a guide disposed between the light emitting element and the light condensing plate for preventing the light emitted from dispersing.

The present invention also provides a camera device comprising a camera module for capturing an image, a light emitting element, and a light condensing plate. The light condensing plate is provided with a light condensing surface having a light dispersing surface disposed on the near side of the light condensing plate facing the light emitting element to equalize the light which is emitted from the light emitting element and a convexo-concave surface on other side of the light condensing plate for condensing the light emitted from the light emitting element. Also, it is preferable that the light condensing plate is unitarily formed with a lens of the camera module or a lens cover of the camera module.

Also, it is preferable that the camera device further comprises a guide disposed between the light emitting element and the light condensing plate for preventing the light from dispersing. Furthermore, it is preferable that a thickest dimension T of the plate between the light condensing plate and which forms the lens or lens cover satisfies a relationship $T \leq 1.0$ mm.

Furthermore, it is preferable that the light emitting element is disposed lower than the lens of the camera module with respect to a surface of a board to which the camera module is attached.

A mobile terminal of the present invention comprises a light emitting element and a light condensing plate. In this embodiment, it is preferable that the light condensing plate is provided with a light condensing surface such that the light condensing plate has a light dispersing surface on a near side of the light emitting element so as to equalize the light which is emitted from the light emitting element and a convexo-concave surface on other side of the light condensing plate for condensing the light emitted from the light emitting element. Also, the mobile terminal further comprises a guide which is disposed between the light emitting element and the light condensing plate for preventing the light from dispersing.

The mobile terminal according to the present invention further comprises a camera module for capturing an image wherein the light condensing plate is unitarily formed with a lens of the camera module or a lens cover of the camera module.

Also, it is preferable that a thickest dimension T of the plate between an area which forms the light condensing plate and an area which forms the lens or a lens cover satisfies the relationship $T \leq 1.0$ mm. Furthermore, it is preferable that the light emitting element is disposed lower than the lens of the camera module with reference to a surface of a board to which the camera module is attached.

DETAILED DESCRIPTION

A flash unit and a camera device according to embodiments of the present invention are explained in detail below with reference to FIGS. 1 to 7C.

Figure 1:
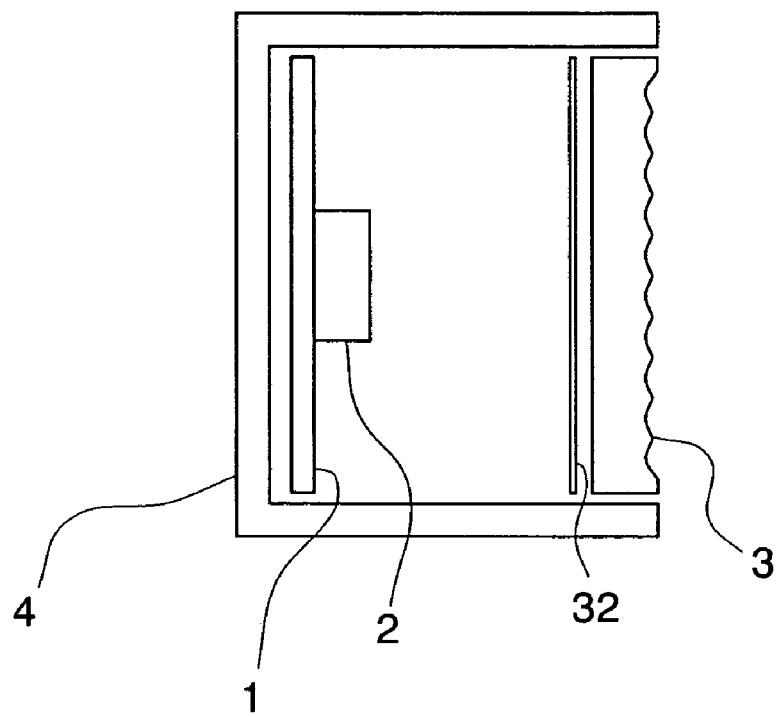
FIG. 1 shows a cross sectional view for a flash unit according to a first embodiment.

As shown in FIG. 1, a flash unit according to a first embodiment of the present invention comprises a base board 1, an LED 2, a light condensing plate 3, and a casing 4.

The base board 1 serves as a circuit board for mounting the LED 2 thereon. For the base board 1, various members such as flexible printed circuit board (hereinafter called an FPC), phenolic paper, or a glass texture epoxy can be used. Also, the base board 1 is fixed closely on the surface of the casing 4. The LED 2 is a luminescent semiconductor element such that the LED 2 emits a light if a voltage in a positive direction is charged thereto.

Figure 3A:
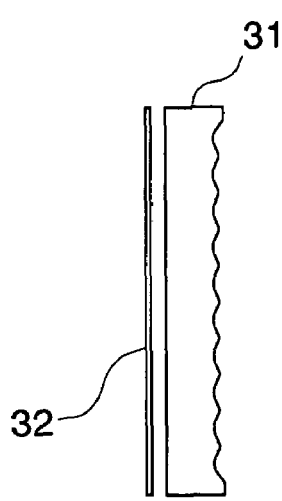
FIG. 3A shows a cross sectional view for a light condensing plate.
Figure 3B:
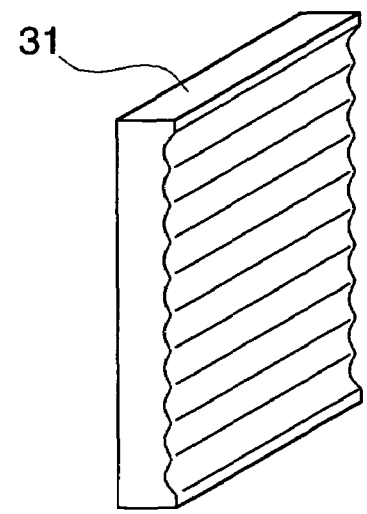
FIG. 3B shows an isometric view for a light condensing plate.

The light condensing plate 3 comprises a member 31 which is formed by molding a transparent resin as shown in FIGS. 3A and 3B. A dimmed print surface 32 is formed on a surface of the light condensing plate 3 so as to equalize light emitted from the light source. The other side of the light condensing plate 3 comprises a convexo-concave shape to condense the light emitted from the light source. As long as the convexo-concave surface condenses the light, it does not matter if the convexo-concave surface is a wavy surface formed by combining a wavy surface and a saw-shape surface or if the combining surfaces have predetermined acute angles.

In the present embodiment, the convexo-concave surface is formed without acute angles, so that a human finger would not be injured while contacting the surface of the convexo-concave surface. Here, the dimmed print surface 32 is disposed near the LED 2 to prevent the printed surface from being deteriorated by contact with human fingers etc. Also, if a dimmed print surface is disposed on the convexo-concave surface, the area which disperses the light increases; thus, the amount of the light which is reflected also increases. Also, the convexo-concave member and the surface of the LED 2 are not parallel; thus, the light may be reflected more frequently in the convexo-concave surface. Therefore, the amount of light which transmits to an object may decrease. The convexo-concave surface is formed so as not to have an acute edge. The casing 4 serves for containing various members which form the above flash unit. The casing 4 is formed with an aperture into which the light condensing plate 3 fits. Here, it is preferable that the casing 4 should be formed by a resin member or a metal member because the casing 4 should be as heavy as possible.

In the flash unit according to the present embodiment, the light condensing plate 3 is disposed such that the dimmed print surface of the light condensing plate 3 faces the LED 2 mounted on the base board 1. The light which is emitted from the LED 2 is equalized on the dimmed print surface and is further condensed by the convexo-concave surface; thus, the light is emitted toward the object to be taken.

Therefore, in the present embodiment, it is possible to obtain an increased amount of light because the light which is emitted from the light source is prevented from dispersing on the convexo-concave surface formed on the dimmed print surface of the light condensing surface 3 and the convexo-concave surface formed on another surface of the light condensing surface 3. Also, the base board on which the LED 2 is mounted can hardly be viewed from the outside; thus, it is possible to form the dispersion print under dimmer condition.

Figure 2:
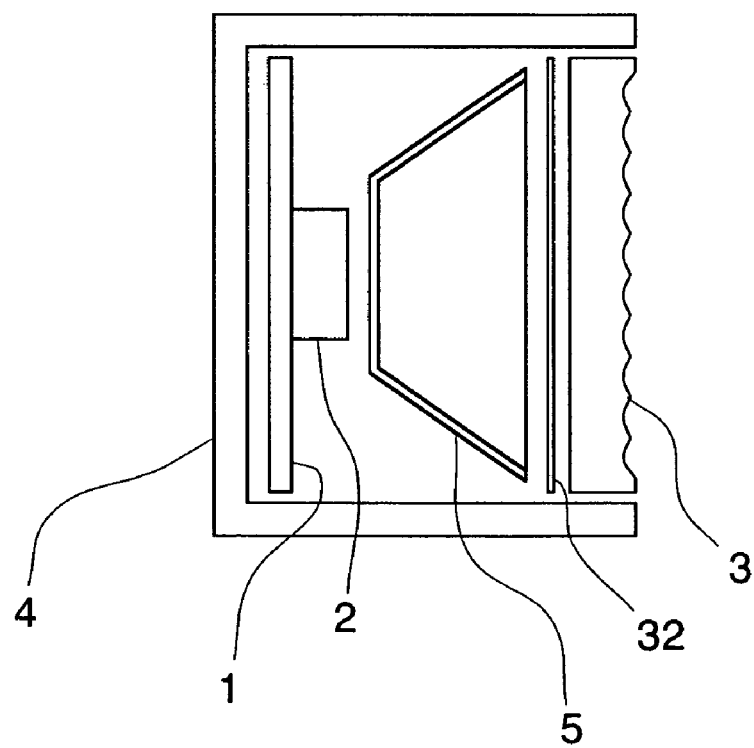
FIG. 2 shows a cross sectional view for a flash unit according to a second embodiment.

In another embodiment of the present invention, a guide 5 is disposed between the LED 2 and the light condensing surface 3 as shown in FIG. 2. The guide 5 is formed by a transparent resin having a frustum shape. A plating treatment is performed on an outside of the guide such that an inner surface of the guide 5 serves as a mirror. The aperture of the guide 5 having an approximate frustum shape near the LED 2 is approximately the same as an area for emitting a light from the LED 2. The guide 5 is disposed near the LED 2 or the guide 5 contacts the LED 2. On the other hand, an aperture near the light condensing plate 3 is approximately the same as the light condensing plate 3 so as to be fixed to a supporting member of the light condensing plate 3.

The operation of the present embodiment are explained with reference to FIGS. 4A and 4B.

Figure 4A:
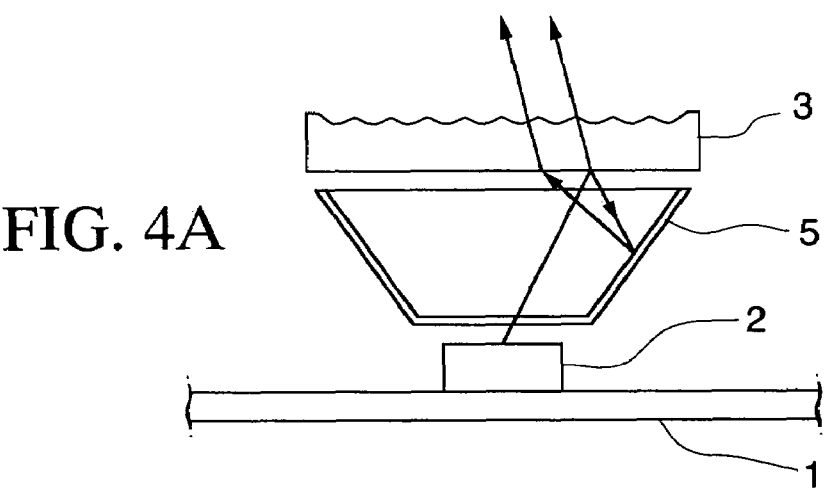
FIGS. 4A and 4B show how a guide and a light condensing plate work in a flash unit according to the second embodiment.
Figure 5A:
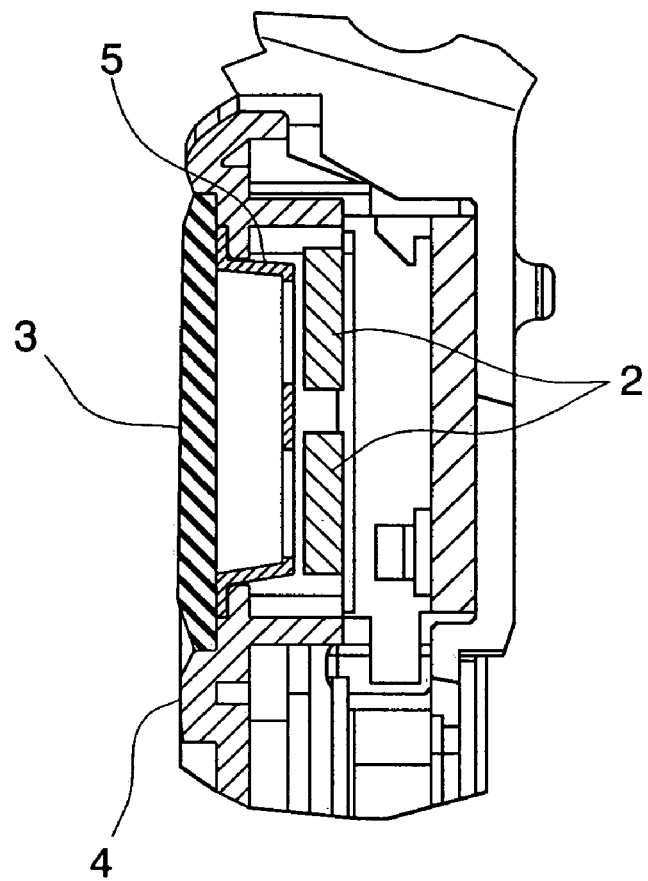
FIGS. 5A and 5B show cross sectional views for a case in which a flash unit according to the second embodiment is used for a mobile terminal.
Figure 5B:
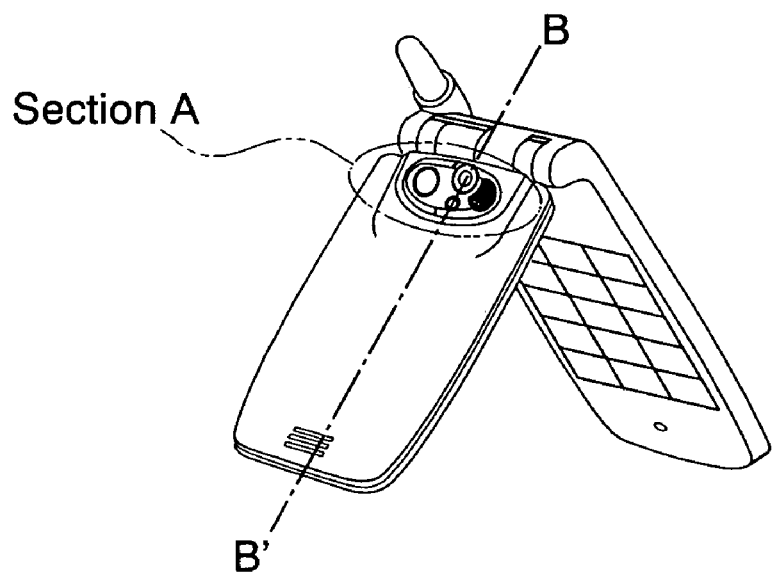

As shown in FIG. 4A, part of the dispersing light is emitted from the LED 2 serves as a light source reaches to the light condensing plate 3 such that the emitted light condition should not change. The rest of the light reaches the light condensing plate 3 while the inner surface of the guide 5 serves as a mirror to reflect and deflect the rest of the light. The rest of the light is reflected also on the dimmed print surface of the light condensing plate 3. The light which returns to the LED 2 is also reflected on the inner surface of the guide 5 so as to be transmitted to the light condensing plate 3 again. FIGS. 5A and 5B show a cross section along line B-B' in which a flash unit is mounted on a mobile terminal. As shown in FIG. 5A, the guide 5 is disposed near two LEDs 2 which serve as light sources. Alternatively, the guide 5 may be disposed so as to contact the LEDs 2. The apertures of the LEDs 2 on the guide 5 are approximately the same as the area for emitting light on the LEDs 2; thus, there is very little light leaking from near the light emitting surface of the LEDs 2. Therefore, as shown in FIG. 2, it is not necessary to contain the flash unit in the casing 4. Therefore, for example, it is possible to use a casing of the mobile terminal for containing the flash unit compatibly.

Figure 4B:
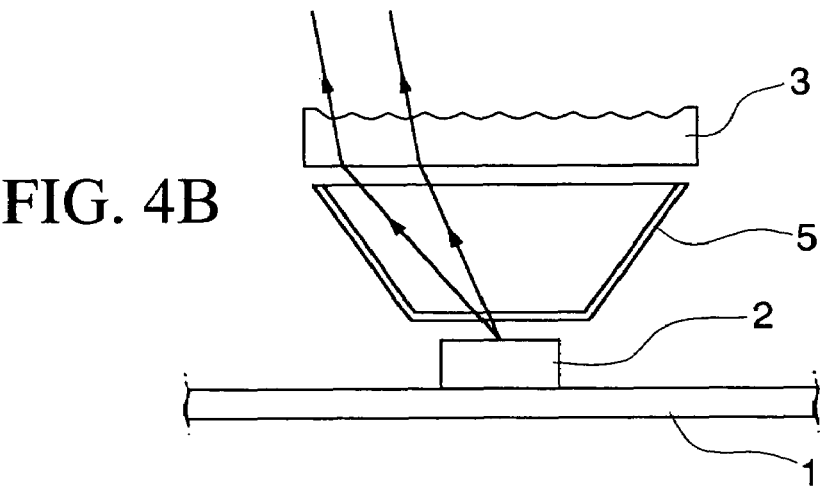

As shown in FIG. 4B, the light which reaches the light condensing plate 3 is equalized on the dimmed print surface. The light which is incident is diffracted by the convexo-concave plane disposed on an opposite side of the light condensing plate 3. Thus, the light is prevented from dispersing entirely and is emitted toward the object to be taken. Therefore, in the present embodiment, it is possible to further restrict the dispersion of the light emitted from the light source by the guide 5 to obtain an increased amount of flash light. Also, the aperture on the guide 5 near the LEDs 2 is approximately the same as the area for emitting the light from the LEDs 2. Also, the guide 5 is disposed near the LEDs 2. Alternatively, the guide 5 is disposed such that it comes in contact with the LEDs 2. Therefore, the base board on which the LEDs 2 are mounted can barely be viewed from the outside.

Next, a camera device in which the above flash unit and a camera module 7 are disposed is explained.

Figure 6A:
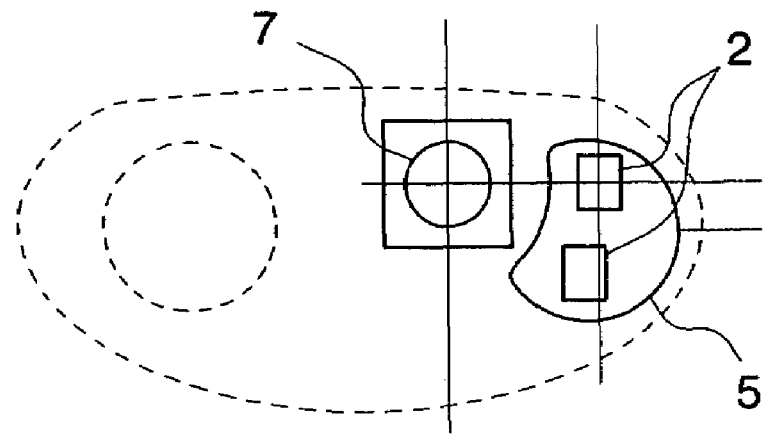
FIGS. 6A to 6C show a structure of a plate which is unitarily formed by the light condensing plate and a lens cover of the camera module.
Figure 6B:
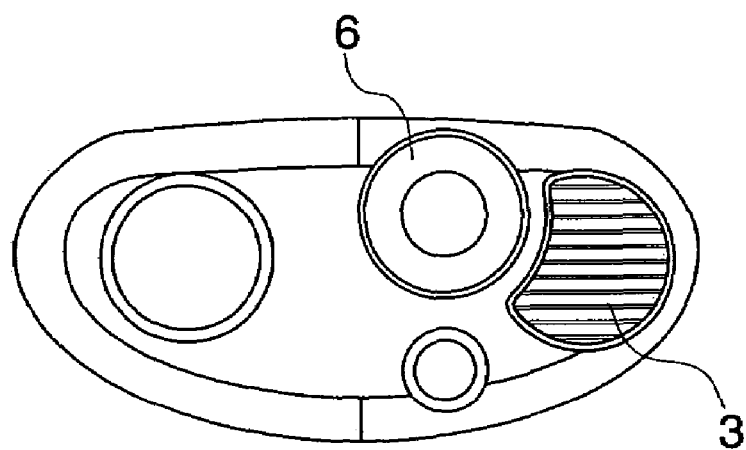
Figure 6C:
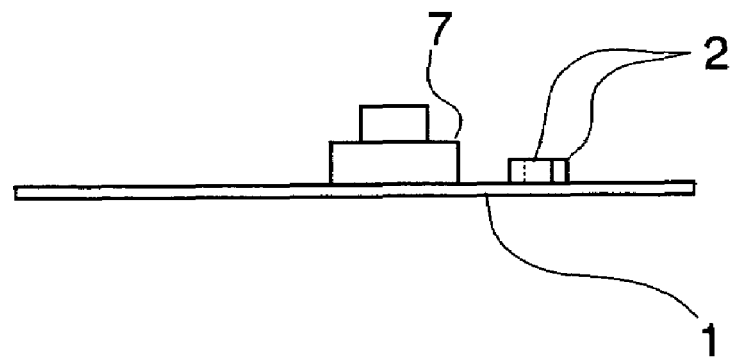

As shown in FIGS. 6A-6C, the cameral module 7 and the flash unit are disposed so as to be near each other in the camera device according to the present invention. In the present embodiment, a distance between center of the camera module 7 and the center of the flash unit is 6.35 mm (see FIG. 6A). Also, a light source in the flash unit is disposed so as to be shifted slightly downwardly with reference to the center of the camera module 7. In the present embodiment, a vertical distance between a center of the camera module 7 and the center of the flash unit is 2 mm (see FIG. 6A).

In FIG. 6B, a plate which is built in a structure shown in FIG. 6A is shown. Here, the plate is a decorated board which is viewed by a user of the camera device. As shown in the drawing, a lens cover 6 of the camera module 7 and the light condensing plate 3 are formed by the same transparent resin decorated board. Here, the thickness of the decorated board between an area of the light condensing plate 3 and an area of the lens cover 6 is determined according to factors such as molding conditions and an influence of the light which is emitted from the flash unit to reach to the camera module 7. FIG. 6C shows a structure in which the camera module 7 and the LEDs 2 are disposed on the base board 1. As shown in the drawing, the light-emitting surfaces of the LEDs 2 are disposed so as to be lower than the lens surface of the camera module 7 with reference to a surface of the base board 1; thus, the flash light is hardly disposed on the lens of the camera module 7.

In order to determine the thickest dimension of the decorated board between the light condensing plate 3 and the lens cover 6, experiments are performed so as to observe how an image may be influenced by the light emitted from the flash unit.

For the above method, the camera module 7 and the light condensing plate 3 of the flash unit are sealed from the light by tightly placing a sponge member or a black textile around the camera module 7 and the light condensing plate 3 of the flash unit to absorb the light. Consequently, an image which is taken with a flashed light and an image which is taken under a complete darkness condition without a flash light are compared.

The above experiment is performed to determine if the light emitted from the flash unit does not reach to the camera module 7 and if the images are the same with regardless to whether or not the flash light is emitted. Evaluations are made of four boards below. As far as an optical transmission is concerned, it is generally understood that acrylic member has superior optical transmission to a polycarbonate member; thus, more light reaches to the camera module 7 in a case of the acrylic member.

1) A polycarbonate decorated board having 0.8 mm thickness

2) An acrylic decorated board having 1.0 mm thickness

3) An acrylic decorated board having 2.0 mm thickness

4) An acrylic decorated board having 3.0 mm thickness

Figure 7A:
FIGS. 7A to 7C shows how light is disposed from the flash unit to the camera module.
Figure 7B:
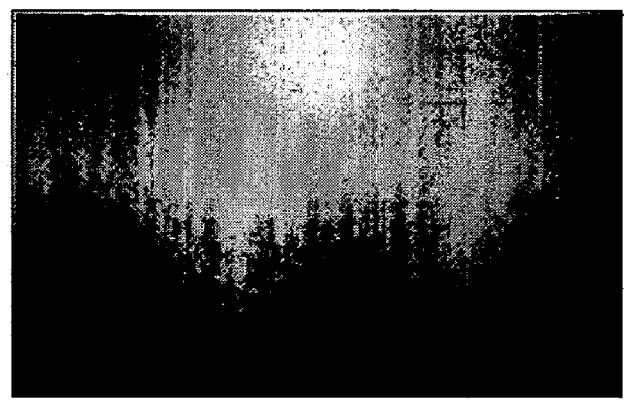
Figure 7C:
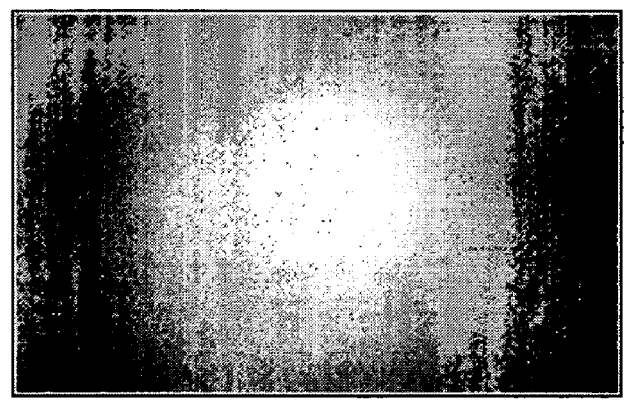
Figure 8A:
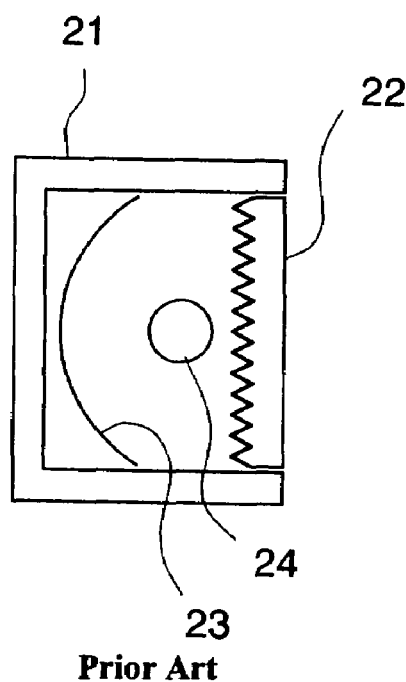
FIGS. 8A and 8B show conventional cameras in which a flash tube is used.
Figure 8B:
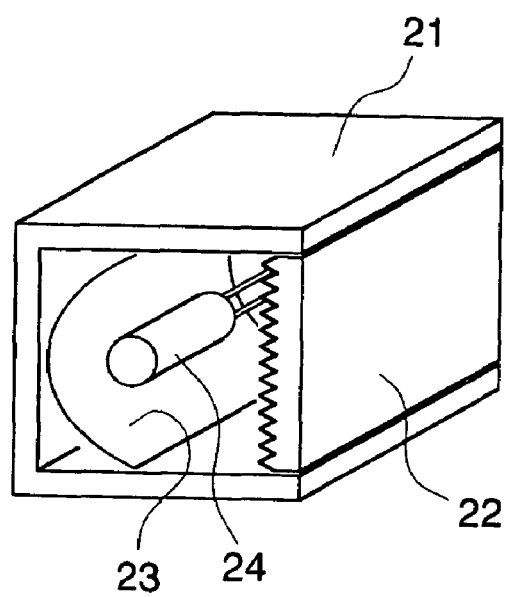
Figure 9A:
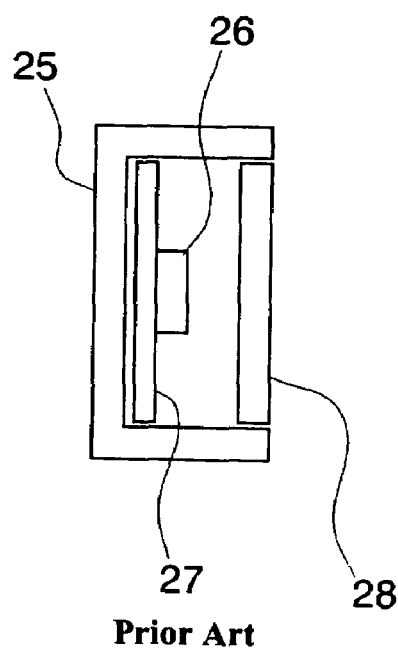
FIGS. 9A and 9B show conventional cameras in which an LED is used.
Figure 9B:
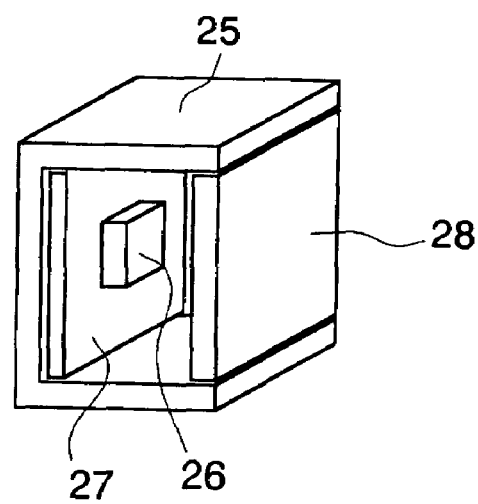

According to results of the above experiments and FIGS. 7A to 7C, it is understood as follows. FIG. 7C shows the thickness of the decorated board being 3.0 mm and the image is entirely cloudy. In a case of FIG. 7B the thickness of the decorated board is 2.0 mm and a cloudy image can be observed from the center of the image to the upper region of the image. In a case of FIG. 7A the thickness of the decorated board is 1.0 mm and a cloudy image cannot be observed; therefore, it can be understood that the images are the same, regardless to whether or not the flash light is emitted. The same result is obtained in a case in which a polycarbonate decorated board having 0.8 mm thickness, which is not shown in the drawing is used.

According to the above experiments, it is understood that the less light emitted from the flash unit reaches to the camera module 7 as long as the thickness of the light condensing plate 3 is as thin as possible. The light which is incident to the light condensing plate 3 is reflected more frequently as long as the thickness of the light condensing plate 3 is as thin as possible; thus, the light is attenuated accordingly. As a result, less light reaches the camera module 7. Therefore, it should be understood that an optimal thickness T of the light condensing plate 3 is $T \leq 1.0$ mm when an acrylic member is used and the above result of the experiments and the molding condition for the light condensing plate 3 are taken into consideration.

The strength of the decorated board depends on a material to be used. More importantly, it should be understood that the decorated board may be rigid, as long as the thickness of the decorated board is approximately 0.8 mm or greater.

According to the present embodiment, the camera module and the flash unit are disposed so as to be near each other; therefore, it is possible for the camera device to be smaller in size. In addition, it is possible to form the lens cover 6 of the camera module and the light condensing plate 3 by a decorated board unitarily. If the camera module and the flash unit are disposed near each other, there is a problem in that a light emitted from the flash unit reaches to the camera module. However, as shown in the above results, the essential function of the light condensing plate 3 will not be deteriorated as long as the thickness of the decorated board is in an appropriate range; thus, it is possible to solve such a problem.

The embodiments of the present invention are described above with reference to the drawings. It should be apparently understood that the invention can be embodied in a wide variety of forms including various alternative design for the disclosed embodiments. Consequently, the specific structural and functional details disclosed herein are merely representative and do not limit the scope of the invention. For example, in the above embodiment, explanations are made for a case in which the light-condensing plate and the lens cover of the camera module are formed unitarily by a plate. However, more importantly, it may be acceptable if the light-condensing plate and the lens of the camera module are formed unitarily by a plate.

Also, in the above embodiments, the dimmed print is placed on a surface of the light-condensing plate such that a color for the dimmed print is not limited. However, more importantly, it is possible to use any color as long as it is a dimmed color such as a dimmed yellow, or a dimmed blue other than a dimmed white.

In the present embodiment, a light condensing plate is provided with a dimmed light-dispersing print is disposed thereon near the light-emitting element for equalizing intensity of a light. The other side of the light condensing plate comprises and a convexo-concave surface on other side of the light condensing plate for condensing the light which is emitted from the light emitting element. Therefore, the dispersing light which is emitted from the light-emitting element is equalized on the print surface on the light-condensing plate. Also, the equalized light is condensed efficiently by the convexo-concave surface which is disposed in an opposite region. Thus, a sufficient amount of the light is emitted toward an object to be taken.

Also, a guide is provided for preventing a light from dispersing is disposed between the light-emitting element and the light-condensing plate. Therefore, the dispersing light from the light-emitting element is prevented from dispersing by the guide. Furthermore, the light which passes through the guide is equalized on a print surface on the light-condensing plate so as to be condensed by the convexo-concave surface efficiently; thus, a sufficient amount of light is emitted toward an object to be taken.

Also, the light-condensing plate and the lens of the camera module are disposed on a thin plate. Alternatively, the light-condensing plate and the lens cover of the camera module are disposed on a thin plate. By doing this, the camera module and the flash unit are disposed so as to be near each other. Therefore, it is possible to form an entire camera device in a thin and small dimension. Here, the thickness of the light-condensing plate is in a constant range; thus, it is possible to form an entire camera device in a thin and small dimension. Furthermore, the light-condensing plate is formed in thin manner, the light which is incident to the light-condensing plate is reflected more frequently. Therefore, it is possible to prevent the light from being attenuated and reached in the camera device.

Also, the light-emitting surface of the light-emitting element is disposed so as to be lower than the lens surface of the camera module with reference to a surface of the base board on which the camera module is mounted. Therefore, it is possible to prevent the light which is emitted from the light-emitted element from reaching to the camera module by an optical dispersion.

Also, a small and thin flash unit or a small and thin camera device which can obtain a sufficient amount of flash light is disposed in a mobile terminal; therefore, it is possible to realize a desirable portability with a superior image quality.

As explained above, according to the present invention, it is possible to form a flash unit and a camera device in a small and thin dimension. Therefore, there is an effect in that it is possible to propose a flash unit, a camera device, and a portable terminal which are required to have a superior portability.

What is claimed is:

1. A camera device comprising:
   a camera module disposed on a substrate for capturing an image; and
   a flash unit having: two LEDs implanted directly on the substrate having the camera module directly thereon, the two LEDs adjoining the camera module; a light condensing plate; and a guide that is disposed between the two LEDs and the light condensing plate for preventing the light emitted from the two LEDs from dispersing, wherein
   the light condensing plate comprises a light-dispersing surface on a side of the light-condensing plate facing the two LEDs to equalize light emitted from the two LEDs; and a surface having a light-condensing function on the other side of the light-condensing plate for condensing light emitted from the two LEDs,
   the guide has opening sections, each of which is equal to the emission area of each LED, and each opening section is disposed in proximity of each emission area or in contact with each emission area of each LED, and
   one of the two LEDs, herein defined as a first LED, is disposed in the vicinity of the camera module relative to a first line orthogonal to a second line passing through the center of a lens surface of the camera module and the other LED herein defined as a second LED.

2. The camera device according to claim 1 wherein the light condensing plate is unitarily formed with a lens of the camera module.

3. The camera device according to claim 1 wherein the light condensing plate is unitarily formed with a lens cover of the camera module.

4. The camera device according to claim 2 wherein a thickest dimension T of a plate between the light condensing plate and said lens is $T \leqq 1.0$ mm.

5. The camera device according to claim 3 wherein a thickest dimension T of a plate area between the light condensing plate and said lens cover is $T \leqq 1.0$ mm.

6. A camera device according to claim 1, wherein the guide includes a parallel plane provided in parallel with the light condensing plate and a tapered plane extending from the parallel plane.

7. A mobile terminal comprising:
   a camera module disposed on a substrate for capturing an image;
   two LEDs implemented directly on the substrate having the camera module thereon, the two LEDs adjoining the camera module;
   a flash unit having: the two LEDs; a light-dispersing plate; and a guide that is disposed between the two LEDs and the light-condensing plate for preventing the light emitted from the two LEDs from dispersing, wherein
   the light-dispersing plate, comprises:
      a light condensing surface disposed on a side of the light condensing plate facing the two LEDs to equalize light emitted from the two LEDs; and surface having light-condensing function on the other side of the light condensing plate for condensing light emitted from the two LEDs;
   the guide has opening sections that each of which is equal to the emission area of the two LEDs, and the each opening section is disposed in proximity of each emission area or in contact with each emission area, and
   one of the two LEDs, herein defined as a first LED, is disposed in the vicinity of the camera module relative to a first line orthogonal to a second line passing through the center of a lens surface of the camera module and the other LED herein defined as a second LED.

8. The mobile terminal according to claim 7 further comprising a camera module for capturing an image and the light condensing plate is unitarily formed with a lens of the camera module.

9. The mobile terminal according to claim 7 further comprising a camera module for capturing an image and the light condensing plate is unitarily formed with a lens cover of the camera module.

10. The mobile terminal according to claim 8 wherein a thickest dimension T of a plate area between the light condensing plate and said lens is $T \leqq 1.0$ mm.

11. The mobile terminal according to claim 9 wherein a thickest dimension T of a plate area between the light condensing plate and said lens cover is $T \leqq 1.0$ mm.

12. The mobile terminal according to claim 7, wherein the camera module is disposed on the substrate.

13. A mobile terminal according to claim 7, wherein the guide includes a parallel plane provided in parallel with the light condensing plate and a tapered plane extending from the parallel plane.

* * * * *